United States Patent [19]

Myers

[11] Patent Number: 4,904,105
[45] Date of Patent: Feb. 27, 1990

[54] TENSIONED GRATING FASTENER

[76] Inventor: Robert E. Myers, 18507 Prince Willian La., Houston, Tex. 77058

[21] Appl. No.: 266,600

[22] Filed: Nov. 3, 1988

[51] Int. Cl.$^4$ ............................................. F16B 2/12
[52] U.S. Cl. .................................... 403/24; 403/387; 403/405.1; 52/507
[58] Field of Search ................. 403/386, 387, 384, 24, 403/405.1, 400; 52/507

[56] References Cited

U.S. PATENT DOCUMENTS

| | | | |
|---|---|---|---|
| 1,238,462 | 8/1917 | Utley | 403/384 |
| 2,467,877 | 4/1949 | Barry | 52/507 |
| 2,682,694 | 7/1954 | Kempkes | 269/249 |
| 3,367,078 | 2/1968 | Thompson, Jr. | 52/507 |
| 4,180,343 | 12/1979 | Finlay | 403/24 |
| 4,362,422 | 12/1982 | Zinkmann et al. | 403/387 |
| 4,798,029 | 1/1989 | Carlton | 52/507 |

FOREIGN PATENT DOCUMENTS 862487 12/1940 France ................................ 292/64

OTHER PUBLICATIONS

Product brochure "Grate Grip ™", Grate Grip, Inc. P.O. Box 6848, New Orleans, LA 70174-6848.
Product brochure "Grate-Fast", Struct-Fast 20 Walnut Street, Suite 101, Wellesley Hills, MA 02181.

Primary Examiner—Randolph A. Reese
Assistant Examiner—Carol I. Bordas
Attorney, Agent, or Firm—Sughrue, Mion, Zinn, Macpeak & Seas

[57] ABSTRACT

A tensioned grating fastener that includes a deep draft saddle clip of U-shaped configuration that is engagable with a pair of load-support bars of a criss-cross configurated grating, an elongated foot that is provided with a vertical upstanding headed stud which projects through a hole of the saddle clip and a coil spring that is concentrically mounted under slight compression about the stud between the head of the stud and the base of the saddle clip. The depression of the headed stud compresses the coil spring and permits the foot to be rotated from a position in alignment with the saddle clip to a position at an oblique angle thereto, such that one end of the foot is beneath and in engagement with a flange of an underlying grating support member, and the opposite end, beneath and in engagement with one parallel load-supporting bars of the grating. Release of the depressed headed stud partially relaxes the compressed coil spring while ensuring tensioning of the clip engaged grating against the support flange to overcome vibration of the assembly of the grating to the flanged support.

8 Claims, 2 Drawing Sheets

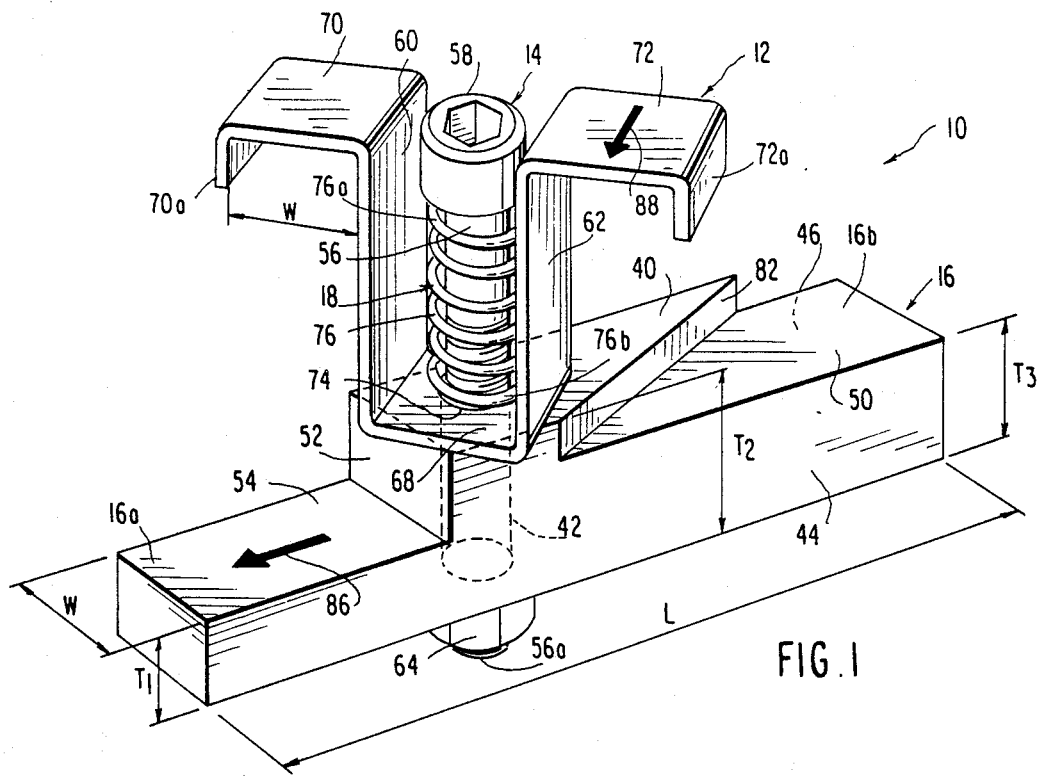

TENSIONED GRATING FASTENER

FIELD OF THE INVENTION

This invention relates generally to a releasable fastener, and more particularly to an improved, tensioned grating fastener assembly for maintaining sections of grating in contact with a support under spring applied tension.

BACKGROUND OF THE INVENTION

Sections of grating or grates, whether of metal, or fiberglass reinforced molded resin, are often used in forming structural walkways or floors. Each section of grating requires proper positioning in place and securement to an underlying support. In the past, sections of grating have been either fixably bolted or welded in place. Both fastening techniques are time-consuming and expensive in terms of labor. The use of bolts requires that holes be drilled in the underlying support member, creating a weak spot subject to rusting and other corrosion damage. In certain situations, the sections of grating must be removable for access to areas beneath the floor or walkway.

This has created the need for a releasable anchoring fastener for anchoring sections of grating to an underlying support.

Representative grating fasteners are illustrated by U.S. Pat. No. 4,180,343 issued Dec. 25, 1979 to Glen Finlay and entitled "Grating Fastener"; U.S. Pat. No. 3,367,078 issuing Feb. 6, 1968 to J. B. Thompson Jr., and entitled "Fastening Device For Expanded-Metal Sheets"; and U.S. Pat. No. 2,467,877 issued Apr. 19, 1949 to R. J. Barry and entitled "Fastening Device".

Each of these grating fasteners employ a threaded screw or bolt which has a headed end projecting through a hole within a base portion of a hook member, plate or saddle clip. The shank of the screw or bolt project through a hole within a foot of narrow, elongated form, capable of passing through a slot between parallel bars of the grating. The foot at one end contacts the surface of a support member flange opposite that contacting the grating itself, while the opposite end thereof includes means integral with or affixed thereto for contacting one or more of the cross-bars to the side thereof opposite the screw or bolt forming the connection between the hook element and the foot.

While such fasteners have performed adequately and while they releasably secure the grating to an underlying support, where the grating is subjected to vibration, it has a tendency to loosen. Further, since the bolt or screw is threaded either into a nut on the face of the foot opposite that of the hook element to lock the hook element to one or more parallel bars and the foot to the support flange at one end and one or more of the bottom of the parallel bars by tensioning of the bolt or screw, such requires the threading the screw or bolt to the threaded hole within the foot, or the nut threadably carrying the same, which takes considerable time, preventing quick installation. Further in some cases access to the slot within the headed end of the screw or nut is difficult, if not impossible.

It is therefore a primary object of the present invention to provide an improved grating fastener which maintains the hook element in contact with the foot via a compression coil spring under slight compression for proper alignment of the components of the fastener assembly which insures the spring tensioning of the hook element over the top of at least one of the grating parallel bars and one end of the foot against the bottom of said one cross bar and the opposite end against the bottom of the support flange where the tensioned grating fastener may have the foot projected through the opening between laterally spaced cross bars permits the foot to be rotated into opposite end engagement with the bottom of the cross bar and the support flange by increasing the compression of the spring and shifting of the hook element at its base relative to the compression coil spring, and wherein the compression of the coil spring maintains the coupling between the grating and the support under an effective heavy, resilient tension bias.

BRIEF DESCRIPTION OF THE DRAWINGS

FIG. 1 is a perspective view of the tensioned grating fastener forming a preferred embodiment of the present invention.

FIGS. 2 through FIG. 4 are top plan views in sequence, showing the assembly and tensioned coupling of the grating to an underlying flanged support member.

DESCRIPTION OF THE PREFERRED EMBODIMENT

Figure 4:
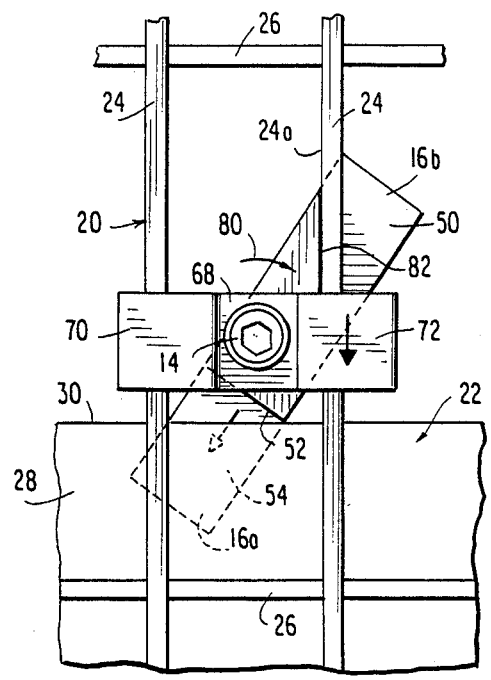

Referring to the drawings, wherein like reference numerals designate like parts throughout the views, there is shown an improved, tensioned grating fastener, indicated generally at 10, forming a preferred embodiment of the invention. Fastener 10 consists essentially of four parts, a deep-throated saddle clip indicated generally at 12, a headed stud indicated generally at 14, an elongated, narrow foot indicated generally at 16, and a compression coil spring 18. The use of the fastener 10 is particularly suited for releasably securing a grate or section of grating indicated generally at 20, FIGS. 2 through 4 inclusive, to an underlying support indicated generally at 22, FIGS. 3 and 4, which may be of angle iron form. The grating 20 is of conventional form and the grating 20 and the support 22 may be identical to the section of grating 12 as shown in U.S. Pat. No. 4,180,343 and its underlying support 14 which may be an angle bar of L-shaped cross section.

In that respect, the grating 20 is conventional and consists of a plurality of spaced parallel load-bearing bars 24, interconnected by right-angle spaced, cross bars 26 in accordance with that of U.S. Pat. No. 4,180,343. The foot 16 is formed of metal bar stock, is of elongated, parallel piped form, having a length L which is significantly larger than the distance D, FIG. 2 between laterally opposed parallel load-bearing bars 24 and a width W which is narrower than the distance D between such bars. As such, the foot 16 may be positioned between the bars and dropped below those bars when the grating 20 is horizontally positioned and supported upon a pair of metal supports such as angle bars one of which is shown at 22 in FIGS. 3 and 4. The angle bar, as per U.S. Pat. No. 4,180,343 includes a horizontal flange 28 terminating in an edge 30 beneath which projects end 16a of the foot 16. The foot 16 is stepped such that end 16a is of a first thickness $T_1$ which is significantly less than the portion at its rear end 16b, which is of a thickness $T_3$. Further, there is a vertical hole 42 drilled through the foot 16 from the top surface 40 of the vertically-stepped portion or end 16b and which extends at right angles to that surface and projects completely through the foot. Additionally, there is a diagonal cut across the end 16b of the foot from one side, 44 of the foot to the other 46, forming a recess 46 and providing a flat surface 50 which is at a vertical height which reduces a portion of end 16b of the foot to a thickness $T_3$. Preferably, $T_2$ is greater than $T_3$ which is greater than $T_1$. Thus, there is a right angle shoulder or wall 52 to the left of hole 42 at the termination of the flat upper surface 54 of the foot at left end 16a, and the surface 40 of the maximum vertical thickness of the foot.

Projecting vertically through hole 42 is the threaded shank 56 of bolt 14 whose headed end 58 normally is received within a space defined by vertical side walls 60, 62 of saddle clip 12. The diameter of the threaded shank 56 of bolt 14 is slightly smaller than the diameter of hole 42 passing through the foot 16. A nut 64 may be threaded to end 56a of the threaded shank 56 which projects below the bottom 66 of the foot. The saddle clip 12 is formed with a flat, horizontal base 68 of a lateral width somewhat shorter than the distance D between load-bearing bars 24. Integrally formed and projecting upwardly from opposite sides of the base 68 are vertical side walls 60, 62 of the saddle clip those walls terminating in oppositely directed hooks 70 and 72. The saddle clip 12 is just one form of a hook element which is capable of hooking to at least one of the load-bearing parallel bars 24 by extending over and about the top of such bars, as indicated by FIGS. 2 through 4 inclusive. The saddle clip base 68 is provided with a circular hole within the center thereof as at 74, through which projects the threaded shank 56.

A key element to the improved tensioned grating fastener of the present invention is the utilization of a coil spring 76 having an inner diameter in excess of the diameter of the bolt shank 56 and having an outer diameter less than the distance between the vertical side walls 60, 62 of the saddle clip 12. Further, the inner diameter of the coil spring is less than the diameter of head 58, such that one end 76a of the coil spring normally abuts the bottom of the head 58 while the opposite, lower end of the coil spring 76b abuts the upper surface of saddle clip base 68. Further, preferably, the coil spring is sized so that it is under light compression with the components assembled in the manner of FIG. 1 and is maintained under that condition by nut 64 on the projecting end 56a of the bolt shank 56. It is important that the lateral distance W between a vertical side wall 60 or 62 and vertical end wall 70a, 72a is greater than the thickness of the grating parallel bar 24 received therein, as evidenced in FIGS. 2 through 4, inclusive. Obviously, in order for the saddle clip to work efficiently, the hooks 70 and 72 are required to wrap over the tops of adjacent parallel load-bearing bars 24 when the fastener 10 is positioned in the manner of FIG. 2. In achieving a quick spring-biased and tensioned connection or coupling between the grating 20 and an underlying support 22 the fastener 10 is positioned such that the saddle clip 12 spans ,transversely across and overlies a pair of parallel grating bars 24 and with the foot oriented at 90° relative to the clip, such that the foot can be dropped in place between two parallel bars, FIG. 2. Further, the front end 16a of the foot must face the flange 28 of support 22 such that its upper face 54 rides under the leading edge 30 of the flange 28, FIG. 3.

When, in accordance with FIG. 2, the fastener as an assembly is moved in the direction of the two arrows: one arrow 86 overlies the foot 16, and the other arrow 88, the right side hook 72 of the fastener 10. Preferably, in sliding the fastener 10 in the direction of the arrows toward support 28, the upper face of the front end 16a of the foot moves beneath and in contact with the bottom face of flange 28. In effecting that type of action, it is necessary that the foot be pulled downwardly or, alternatively, the bolt 58 be depressed downwardly such that the shank 56 of the bolt moves downwardly within circular hole 74 within the base 68 of the saddle clip. In doing so, the spring is further compressed, and this permits the front end 16a of the foot to underlie flange 28 with the edge 30 of the flange of support 22 nearly abutting the shoulder 52 of foot 16.

In the third step of fastening the resilient, tensioned coupling of the fastener 10 to the support 22 and grating 20, the rear end 16b of the foot is rotated as per arrow 80, clockwise as viewed from the top, such that the intermediate step face 50 of the foot rides beneath the bottom of the parallel bar 24 to the right of the fastener 10 as per FIGS. 2, 3, and 4 while the front end 16a of the foot remains beneath flange 28 of the support 22. The vertically oblique face 82 of the foot moves parallel to and preferably in contact with one side 24a of parallel bar 24 of grating 20 until the foot 16 locks rear end 16b under the bearing bar and front end or nose 16a of the foot under flange 28. The compression of the coil spring releases somewhat, however sufficient compression is maintained within the coil spring 76 so that contact between the bottom of the grating 20 and the top of the upper surface of flange 28 is under resilient spring-induced tension at all times. This prevents any loosening of nut 64 on the threaded shank 56 of bolt 14.

The height of the vertical side walls 60. 62 and the vertical height of the bolt 14 above base 68 of the saddle clip are key dimensions with respect to the vertical height of the grating to be mounted to the flange support 22. Preferably the coil spring is of length so as to maintain, under slight coil spring compression contact between the bottom of base 68 of the saddle clip and the top surface 40 of foot 16 and the fastener 10 remains assembled in use and prior to use.

Figure 5:
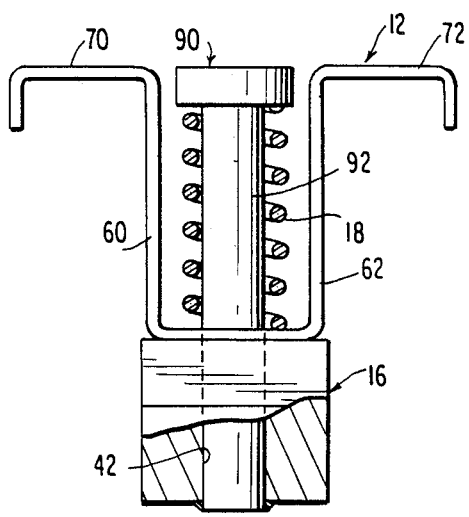
FIG. 5 is a front elevational view with parts in section of a second embodiment of the invention.

Additionally, it is not necessary that a bolt 14 and nut 64 be employed; alternatively, a headed stud 90 as per FIG. 5 may be employed having a reduced diameter shank 92 welded or otherwise affixed to foot 16 with the assembly employing the same saddle clip 12 and an identically configured and dimensioned coil spring 18 as in the embodiment of FIGS. 1 through 4, inclusive.

The stud may have its lower end projecting through a vertical hole within the foot intermediate of the ends of the foot, with the shank of the stud bent over at an end projecting through the bottom of the foot to prevent disengagement between the stud and the foot after assembly thereto.

Figure 6:
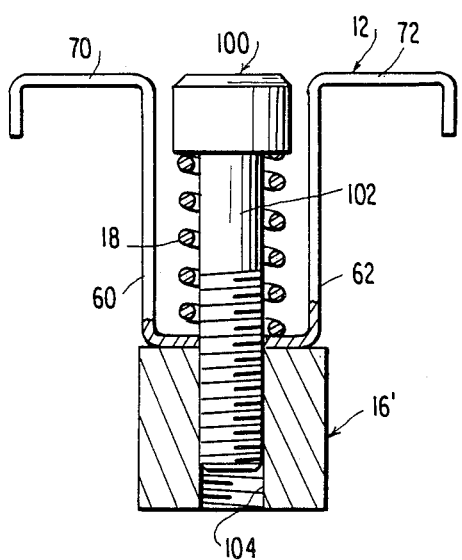
FIG. 6 a front elevational view with parts in section of a third embodiment of the invention.

In the embodiment of FIG. 6, a headed screw indicated generally at 100 may alternately be applied with its shank 102 threaded into a tapped hole 104 within a foot 16, with the tapped hole being partially through or completely through the foot. This embodiment is otherwise identical to that of the first embodiment. In the FIG. 6 embodiment, coil spring 18 again is identical to that of the first embodiment, and saddle clip 12 is also identical to the clip of the first embodiment. The screw 100 may be initially adjusted and then fixed by a pin, epoxy adhesive or the like, so that once the fastener is assembled, with the proper initial compression of the coil spring, the axial position of the screw of the FIG. 6 embodiment does not vary and disassembly of the components as the result of vibration to the fastener is prevented. While it is not necessary that the coil spring apply compressive force prior to use of the fastener, the coil spring is required to produce sufficient tension between the saddle clip and the foot, with the foot engaging opposite faces of the grating, parallel bars, and the support flange, respectively.

Additionally, it is not necessary that a saddle clip be utilized, a hook element may be formed of solely a base member 68, a single vertical side wall as at 60, and a hook 70, such that the hook 70 engages only one parallel bar 24 of the grating. However, in all other respects, the operation and make-up of the fastener is the same as that illustrated in the various embodiments.

Although particular embodiments of the invention have been illustrated in the accompanying drawings and described in the foregoing detailed description, it will be understood that the application is not limited to the embodiments disclosed, but is intended to embrace any alternatives, modifications and rearrangements and/or substitution of parts or elements as fall within the spirit and scope of the invention.

Having thus described our invention, what we claim as new, and desire to secure by Letters Pat. is:

1. A tensioned grating fastener for fastening a grating formed of laterally spaced parallel bars interconnected by longitudinally spaced cross bars to an underlying support having a flange at one side perpendicular to said laterally spaced parallel bars said fastener comprising:
   an elongated foot having a first end positionable in contact with said flange on a face of said flange opposite that in contact with said grating parallel bars:
   a second end positionable in contact with one of said parallel bars proximate to said support;
   a headed rod mounted at one end to the foot and projecting outwardly of the face of said foot, contacting said grating, said rod positionable between adjacent parallel bars;
   a hook element having a base portion with a hole therein, at least one hook element side wall unitary with said base and projecting at right angles thereto to the side of said hole, said hook element side wall terminating at an end remote from said base in a reversely bent hook, sized to fit over and about one of said parallel bars, said headed rod projecting through said hole within said base and coupled to said foot; and
   a coil spring concentrically mounted about said rod having one end in contact with said headed end of said rod and another end in contact with said base; and
   wherein the height of said grating parallel bars, the height of said rod and said hook element side wall and the axial length of said coil spring are such that with said hook fitted over one of said parallel bars, axial displacement of said rod through said hook element base hole in the direction of said foot, causes said coil spring to be placed under compression, permitting rotation of said foot from a position in line with hook element, to a position at an angle therewith and engagement of respective ends of said foot with said support flange and said one grating parallel bar with said coil spring maintained under compression, thereby tensioning said hook engaged grating against said flange support to resist disengagement as a result of vibration or the like.

2. The tensioned grating fastener as claimed in claim 1 wherein said hook element comprises a saddle clip, having laterally spaced, vertically parallel side walls integrally joined to opposite sides of said base, projecting upwardly therefrom and terminating in hooks to opposite sides directed oppositely away from said base, and wherein said hooks are positioned and sized such that they fit over laterally adjacent ones of said parallel bars of said grating.

3. The tensioned grating fastener as claimed in claim 2, wherein the height of the saddle clip side walls are generally equal to the height of the rod from the base to the headed end of said rod, and wherein the axial length of the coil spring is slightly in excess to the distance between the headed end of said rod and said saddle clip base.

4. The tensioned grating fastener as claimed in claim 2, wherein said foot includes a tapped hole within the face of the foot proximate to said hook element, and said headed rod comprises a headed screw having a shank screw threaded into said tapped hole.

5. The tensioned grating fastener as claimed in claim 1, wherein said headed rod is a stud rigidly affixed to said foot.

6. The terminal grating fastener as claimed in claim 1, wherein said headed rod comprises a bolt and a nut, and wherein said foot includes a hole intermediate of its ends projecting therethrough at right angles to the longitudinal axis of the foot, wherein the bolt includes a threaded shank passing through said nut of said hole within said foot, and said nut is threaded to said bolt at the end of said threaded shank on the face of said foot remote from said hook element.

7. The tensioned grating fastener as claimed in claim 1, wherein said foot is thicker at the end contactable with the support flange.

8. The tensioned grating fastener as claimed in claim 7, wherein said end of said foot contactable with the bottom of said support flange is laterally stepped to provide a number of flat surfaces for contact With the bottom edge of said one parallel bar, depending upon the vertical height of the parallel bars of said grating.

* * * * *